Patented May 1, 1951

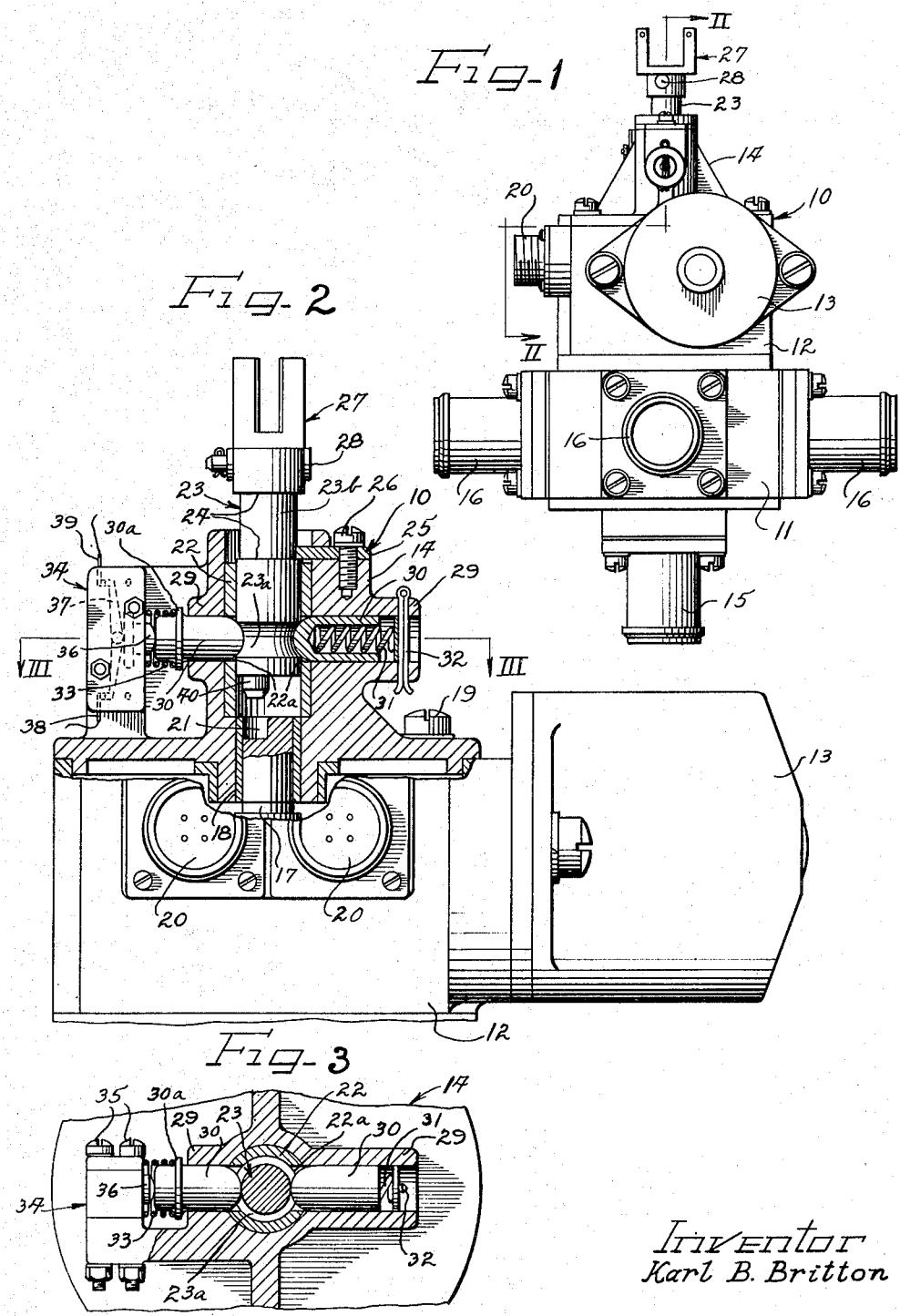

2,550,906

UNITED STATES PATENT OFFICE 2,550,906

MANUAL CONTROL FOR AUTOMATIC VALVES

Karl B. Britton, Bratenahl, Ohio, assignor to Thompson Products, Inc., Cleveland, Ohio, a corporation of Ohio Application April 14, 1945, Serial No. 588,329

3 Claims. (Cl. 137—139)

This invention relates to a device for manually actuating automatic valves while simultaneously disconnecting the automatic drives for the valves.

Specifically the invention deals with a manual override for electrically-driven selector valves wherein the electric valve actuator is automatically disconnected whenever the override device is brought into operation.

In one type of electric valve drive mechanism, electrically-driven selector valves are employed which will automatically assume desired positions in response to electric impulses. In such devices, it is sometimes desirable to manually change the setting of the valves. However, unless the valve is immunized from the electrical control system, the manual setting of the valve will only result in a resetting by the electrical driver in accordance with the position of the selector switch of the electrical system.

The present invention therefore provides a manual override for automatically operated valves which not only couples a manual driver with the valve, but also immunizes the valve from the automatic valve operator.

According to this invention a rotatable drive shaft is slidably mounted in a bearing carried by a casing part of the assembly. This drive shaft is held in disconnected or uncoupled position by spring-pressed plungers which seat in a groove provided in the shaft. One of these plungers actuates a switch which, when opened, disconnects the electric system for the assembly. When it is desired to manually set the valve, the slidable drive shaft is pushed into the bearing into coupled engagement with the plug of the valve. This automatically forces the plungers out of the groove in the shaft and the outward movement of the plunger-controlled switch effects an opening of the switch.

It is thus an object of this invention to provide a manual override for automatically operated valves.

A specific object of the invention is to provide a manual control for electrically operated selector valves wherein the electric system for the valves is de-energized whenever the manual device is coupled with the valve.

Another object of the invention is to provide a driver for a valve or the like which, when coupled with the valve or other part to be driven, automatically uncouples another driver for the valve or part.

A still further object of the invention is to provide a slidable drive shaft arrangement for a selector valve which is normally held in uncoupled relation by spring-pressed plungers but which is adapted to engage the valve and force the spring-pressed plungers to position for disconnecting other driving apparatus for the valve.

Other and further objects of the invention will be apparent to those skilled in the art from the following detailed description of the annexed sheet of drawings which, by way of preferred example only, illustrates one embodiment of the invention.

On the drawings:

Figure 1 is a side elevational view of an electrically driven selector valve assembly equipped with a manual override control in accordance with this invention.

Figure 2 is a fragmentary vertical cross-sectional view, with parts in side elevation, taken substantially along the line II—II of Figure 1.

Figure 3 is a fragmentary horizontal cross-sectional view, with parts in plan, taken along the line III—III of Figure 2.

As shown on the drawings:

The valve assembly 10 shown in Figure 1 includes a selector valve casing 11, a gear casing 12 superimposed on the casing 11, a stepping motor casing 13 connected to the gear casing 12, and the manual override control casing 14 mounted on the gear casing 12.

The valve casing 11 has a central outlet nipple 15 and a plurality of radial inlet nipples 16. A plug (not shown) in the casing 11 selectively connects the outlet nipple 15 with the desired inlet nipple 16. This plug has a shaft 17, shown in Figure 2, rotatably mounted in a sleeve 18 carried by the manual override casing 14. This casing 14, as shown, is conveniently secured onto the gear casing 12 by means of cap screws 19 or the like. A solenoid stepping motor may be provided in the casing 13 and drives the valve plug through a pawl and ratchet arrangement. Electric plugs 20 are secured on the gear casing 12.

The plug shaft 17 has a recess 21 in the upper face thereof offset from the axial center so that when this recess is engaged by a rotating part, it will cause rotation of the plug.

The casing 14 has a bearing sleeve 22 therein slidably receiving a manual drive shaft 23. This drive shaft 23 has a rounded groove portion 23a and a reduced-diameter cylindrical portion 23b spaced from the groove 23a. Shoulders 24 are provided at the ends of the reduced-diameter cylindrical portion 23b.

A key 25 is secured to the casing 14 by means of a cap screw 26 and projects into overlying relation to the bearing sleeve 22 for abutting the shoulders 24 to limit the extent of sliding movement of the shaft 23 in the bearing sleeve 22. As shown, the top shoulder 24 can be provided by a separate yoke member 27 which is pinned to the shaft 23 by means of a pin 28 passed through the yoke and shaft. This yoke 27 is adapted to receive a driving rod or handle.

The casing 14 has two diametrically opposed bosses 29 slidably supporting plungers 30. These plungers are spring-impelled into the groove 23a of the drive shaft 23. One of the plungers, as shown in Figure 2, is hollow and a coil spring 31 is bottomed therein and held under compression by a cotter pin 32 passed through the boss 29. The other plunger 30 has a collar 30a therearound bottoming one end coil of a coil spring 33. The other end coil of this spring 33 is bottomed on a micro-switch casing 34 which is secured to the casing 14 as by means of bolts 35 or the like. This micro-switch casing 34 has a plunger or nib 36 slidably mounted therein and projecting therefrom against the outer face of the collar-equipped plunger. This nib 36 acts on a spring bridge 37 and, when the nib is depressed into the casing 34, the bridge 37 is biased to break connection between contacts 38 and 39 thereby disconnecting all of the electrically operated devices of the assembly.

The bearing sleeve 22 has diametrically opposed apertures 22a receiving the nose ends of the plungers 30 so that these nose ends can seat in the groove 23a of the drive shaft 23.

The drive shaft 23 has a pin 40 depending from the bottom face thereof adapted to fit in the recess 21 of the plug shaft 17.

When it is desired to drive the valve plug from the shaft 23, the shaft is forced into the bearing 22, thereby automatically throwing the plungers 30 out of the groove 23a. The cylindrical wall of the drive shaft holds the plungers in this outwardly depressed position and the nib 36 is thus depressed to open the micro-switch. The pin 40 on the shaft 23 is seated in the recess 21 of the plug shaft 17 and rotation of the shaft 23 through the yoke connection 27 will rotate the plug in the valve to change the setting of the valve as desired. Since the electrical system is de-energized by opening the micro-switch 34, the selected set position for the valve plug will not be interfered with as long as the shaft 23 is in coupled engagement with the plug. As soon as the shaft 23 is uncoupled from the valve plug, however, and the plungers 30 allowed to enter the groove 23a of the shaft, the micro-switch 34 will be closed and the electric system of the valve will be effective to actuate the valve to selected positions in response to electric impulses.

The plungers 30 are thus effective to hold the drive shaft 23 in uncoupled position relative to the valve plug and are also effective to actuate a switch that will uncouple another drive part for the valve.

From the above descriptions it should be understood that this invention provides a simple, inexpensive override control for automatically driven valves which not only is easily coupled with the valves but is effective, during the coupling operation, to uncouple or de-energize other driving parts for the valve.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A valve coupler and automatic switch actuator for a stemmed plug valve driven by an electric motor which comprises, a casing adapted to receive the stem of the plug, a bearing sleeve in said casing, a locally recessed drive shaft slidably and rotatably carried in said sleeve in axial alignment with the stem, mating coupling means on said shaft and stem engageable upon axial movement of said shaft, said shaft having spaced shoulders thereon, means carried by said casing to abut said shoulders for limiting the length of sliding movement of the shaft between a coupled and an uncoupled axial position, a pair of opposed spring-impelled plungers slidably carried by said casing and cooperating with the recess of said shaft to yieldingly retain the shaft in uncoupled axial position, and a switch opened by one of said plungers whenever the shaft is shifted axially to move the plungers out of the localized recess therein, said switch being adapted to deenergize the electric driving motor.

2. An electrically operated plug valve comprising, in combination, a valve body, a selectively rotatable stemmed valve plug therein, an electric stepping motor for selectively rotating said stemmed valve plug, and an override control mechanism including a casing attachable to the valve body, a bearing sleeve in said casing, a shaft having an annular groove therein and being reciprocable and rotatable in said bearing sleeve, a pair of opposed spring-pressed plungers carried in said casing and projecting into said bearing sleeve from diametrically opposed sides thereof, said spring-pressed plungers adapted to seat in said annular groove of said shaft to yieldably retain said shaft in one axial position in said bearing sleeve, a switch positioned in said casing and controlling the electric stepping motor, said switch being actuatable by outward movement of one of said plungers, a pin on the end of said shaft, a pin recess in the stem of said stemmed plug valve, said shaft spaced from and being coaxially disposed with respect to the stem of said stemmed valve plug, whereupon reciprocation of said shaft to mate said pin of said shaft with said pin recess of said stem for manual rotation of the valve plug will simultaneously cam said plungers outwardly to actuate said switch and deenergize the electric stepping motor.

3. In combination with a valve of the type having a selectively rotatable valve plug operated by an electric stepping motor, the improvement comprising, an override control mechanism including a casing attachable to the valve body, a bearing sleeve in said casing, a shaft having an annular groove therein and being reciprocable and rotatable in said bearing sleeve, a pair of opposed spring-pressed plungers projecting into said bearing sleeve from diametrically opposed sides thereof, said plungers adapted to seat in said annular groove to yieldingly retain said shaft in one axial position in said bearing sleeve, a switch controlling the electric stepping motor and being actuatable by outward movement of said plungers, a pin on the end of said shaft and a plug stem with a pin recess therein, said shaft being spaced and coaxially disposed with respect to said plug stem, said plug stem having a driven connection with the valve plug, whereupon reciprocation of said shaft to mate said pin of said shaft with said pin recess of said plug stem for manual rotation of the valve plug will simultaneously cam said plungers outwardly to actuate said switch and de-energize the electric stepping motor.

KARL B. BRITTON.

REFERENCES CITED

The following references are of record in the file of this patent:

UNITED STATES PATENTS

| Number | Name | Date |
|---|---|---|
| 1,040,327 | Hollis | Oct. 8, 1912 |
| 1,162,935 | Lange | Dec. 7, 1915 |
| 1,575,826 | Goetz | Mar. 9, 1926 |
| 1,747,594 | Panish | Feb. 18, 1930 |
| 1,786,119 | Lansing | Dec. 23, 1930 |
| 2,253,431 | Johansen | Aug. 19, 1941 |
| 2,255,739 | Curtis | Sept. 9, 1941 |
| 2,286,597 | Bruckel | June 16, 1942 |
| 2,385,203 | Hanna | Sept. 18, 1945 |